(12) United States Patent
Kim et al.

(10) Patent No.: US 7,430,632 B2
(45) Date of Patent: Sep. 30, 2008

(54) DATA MANAGEMENT APPARATUS AND METHOD FOR DETERMINING A RESPONSE TIME IN FLASH MEMORY DEVICES

(75) Inventors: Hyo-jun Kim, Seoul (KR); Ji-hyun In, Seongnam-si (KR); Kwang-yoon Lee, Seongnam-si (KR); Tae-sun Chung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 338 days.

(21) Appl. No.: 11/077,157

(22) Filed: Mar. 11, 2005

(65) Prior Publication Data
US 2005/0201160 A1 Sep. 15, 2005

(30) Foreign Application Priority Data
Mar. 11, 2004 (KR) ............... 10-2004-0016567

(51) Int. Cl.
*G06F 12/00* (2006.01)
*G06F 13/00* (2006.01)
(52) U.S. Cl. ............... 711/103; 711/158; 711/167; 711/118; 365/185.33
(58) Field of Classification Search ............... 711/103, 711/158, 167, 118; 365/185.33; 717/162
See application file for complete search history.

(56) References Cited

U.S. PATENT DOCUMENTS

| | | | | |
|---|---|---|---|---|
| 5,471,604 A * | 11/1995 | Hasbun et al. | ............... | 711/4 |
| 5,509,134 A | 4/1996 | Fandrich et al. | | |
| 6,370,651 B1 * | 4/2002 | Durante et al. | ............... | 713/322 |
| 6,374,337 B1 * | 4/2002 | Estakhri | ............... | 711/169 |
| 7,137,027 B2 * | 11/2006 | Shiota et al. | ............... | 714/5 |
| 2002/0126541 A1 * | 9/2002 | Spiegel et al. | ............... | 365/189.07 |
| 2003/0067814 A1 * | 4/2003 | Piau et al. | ............... | 365/189.05 |
| 2003/0147297 A1 * | 8/2003 | Shiota et al. | ............... | 365/230.03 |
| 2003/0206442 A1 * | 11/2003 | Tang et al. | ............... | 365/185.17 |
| 2004/0230738 A1 * | 11/2004 | Lim et al. | ............... | 711/103 |
| 2005/0144360 A1 * | 6/2005 | Bennett et al. | ............... | 711/103 |
| 2005/0166004 A1 * | 7/2005 | Campanale et al. | ............... | 711/103 |
| 2005/0195635 A1 * | 9/2005 | Conley et al. | ............... | 365/149 |
| 2006/0004949 A1 * | 1/2006 | Van Steenwijk et al. | ............... | 711/103 |

FOREIGN PATENT DOCUMENTS

| | | | |
|---|---|---|---|
| CN | 1281570 A | | 12/1997 |
| GB | 2395032 A | * | 5/2004 |
| JP | 2000057039 A | | 2/2000 |
| JP | 2001-27966 A | | 1/2001 |
| JP | 2001027966 A | | 1/2001 |
| JP | 2001-315388 A | | 12/2001 |

* cited by examiner

*Primary Examiner*—Hong Kim
(74) *Attorney, Agent, or Firm*—Sughre Mion, PLLC (57) ABSTRACT

Provided are a data management apparatus and method used for a flash memory, which can guarantee predetermined response time by expecting when a user will receive a response to his or her request for performing a data operation on the flash memory. The data management apparatus includes an operation determination unit which determines operations required for performing a data operation on a flash memory, the data operation being requested by a user using a user program, an operation registration unit with which an operation list including the operations determined to be required for performing the requested data operation on the flash memory is registered, and an operation processing unit which selects one of the operations included in the operation list registered with the operation registration unit and performs the selected operation.

35 Claims, 11 Drawing Sheets

FIG. 1 (PRIOR ART)

| LOGICAL ADDRESS | PHYSICAL ADDRESS |
|---|---|
| 1 | 1 |
| 2 | 2 |
| ⋮ | ⋮ |
| n | n |

DATA MANAGEMENT APPARATUS AND METHOD FOR DETERMINING A RESPONSE TIME IN FLASH MEMORY DEVICES

CROSS-REFERENCE TO RELATED APPLICATION

This application claims priority from Korean Patent Application No. 10-2004-0016567 filed on Mar. 11, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to a data management apparatus and method used for a flash memory, and more particularly, to a data management apparatus and method used for a flash memory that can guarantee predetermined response time by expecting when a user will receive a response message regarding his or her request for performing a data operation on the flash memory.

2. Description of the Related Art

In general, home appliances, communications devices, and embedded systems, such as set-top boxes, use non-volatile memories as storage devices for storing and processing data.

Flash memories are one type of non-volatile memory, in which data can be electrically erased and overwritten. Flash memories are suitable for portable devices because they consume less power than magnetic disc memory-based storage mediums, are as accessible as hard discs, and are compact-sized.

Due to the hardware characteristics of flash memories, data recorded on a flash memory is erased in units of blocks, unlike in the conventional random access memory (RAM), nonvolatile storage medium or magnetic storage medium.

In other words, in the flash memories, data is recorded on a sector as a logical operation unit of a host while data recorded on the sector is erased by deleting the overall blocks containing the sector.

Since a unit in which data is recorded on a flash memory is different from a unit in which data is erased from the flash memory, the performance of the flash memory may deteriorate.

In order to prevent the performance of the flash memory from deteriorating for this reason, logical addresses and physical addresses have been suggested.

In other words, to perform data reading or writing operations, predetermined logical addresses are changed into physical addresses of the flash memory through various types of algorithms. In this case, the performance of the flash memory can be maximized by performing mapping in consideration of physical conditions of the flash memory.

Flash memories may include a predetermined memory for storing a mapping table that converts a logical address into a physical address.

The mapping table is generally stored in an SRAM. However, the mapping table may also be stored in a ROM, PROM, EPROM, a cache memory, or a DRAM.

Figure 1:
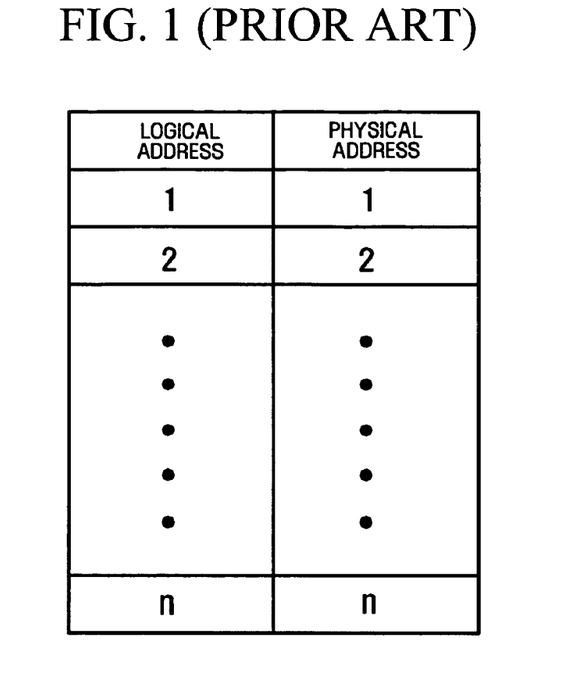
FIG. 1 is a diagram illustrating a typical mapping table.

An example of the mapping table is illustrated in FIG. 1. Referring to FIG. 1, the mapping table shows logical addresses and the respective physical addresses.

When repeatedly modifying or erasing data stored in a flash memory, physical addresses of the flash memory at which the data is stored are likely to be changed. The mapping table makes the data stored in the flash memory accessible using the same logical addresses regardless of the change of the physical addresses.

Data stored in a flash memory is accessible using a logical address, which is comprised of a cylinder serial number, a head serial number, and a sector serial number. A logical address LSA may be expressed using Equation (1):

$$LSA = (C*HpC+H)*SpH+S-1 \qquad (1)$$

where C is a cylinder serial number, HpC is the number of heads of each cylinder, H is a head serial number, SpH is the number of sectors of each head, and S is a sector serial number.

As described above, a logical address is converted into a physical address using the mapping table so that a data operation, such as a write operation, is performed on the physical address.

A flash memory is classified into a small-block flash memory or a large-block flash memory. In a small-block flash memory, a logical operation unit is identical to a physical operation unit, while in a large-block flash memory, a physical operation unit is larger than a logical operation unit and thus includes at least one logical operation unit.

Figure 2:
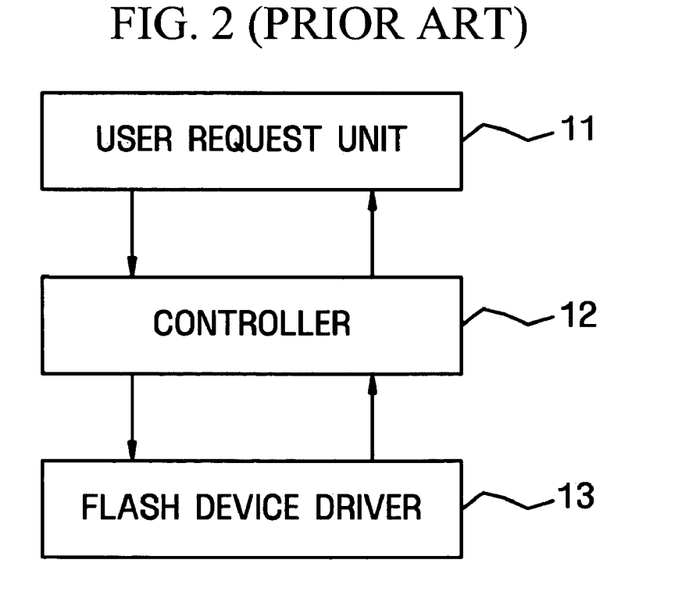
FIG. 2 is a block diagram of a conventional data management apparatus used for a flash memory.

A conventional data management apparatus used for a flash memory is illustrated in FIG. 2. Referring to FIG. 2, the conventional data management apparatus includes a user request unit 11, to which a user issues a request for performing a data operation on a flash memory using a predetermined user program and from which the user receives a response message indicating whether the data operation is completed, and a controller 12, which controls a flash device driver 13 so that the data operation can be performed on the flash memory at the user's request.

When writing data to a sector of the flash memory, a block to which the sector belongs may be entirely erased.

Before erasing the block to which the sector belongs, effective sectors of the corresponding block where valid data is stored may be copied to another block.

The erasure of a block and the copying of effective sectors in the block to another block may be performed at least once.

In addition, it is determined how many iterations of erasing a block and then copying effective sectors in the block to another block should be performed in consideration of an internal algorithm of the flash memory.

The operation of the conventional data management apparatus used for a flash memory will now be described in further detail.

Figure 3:
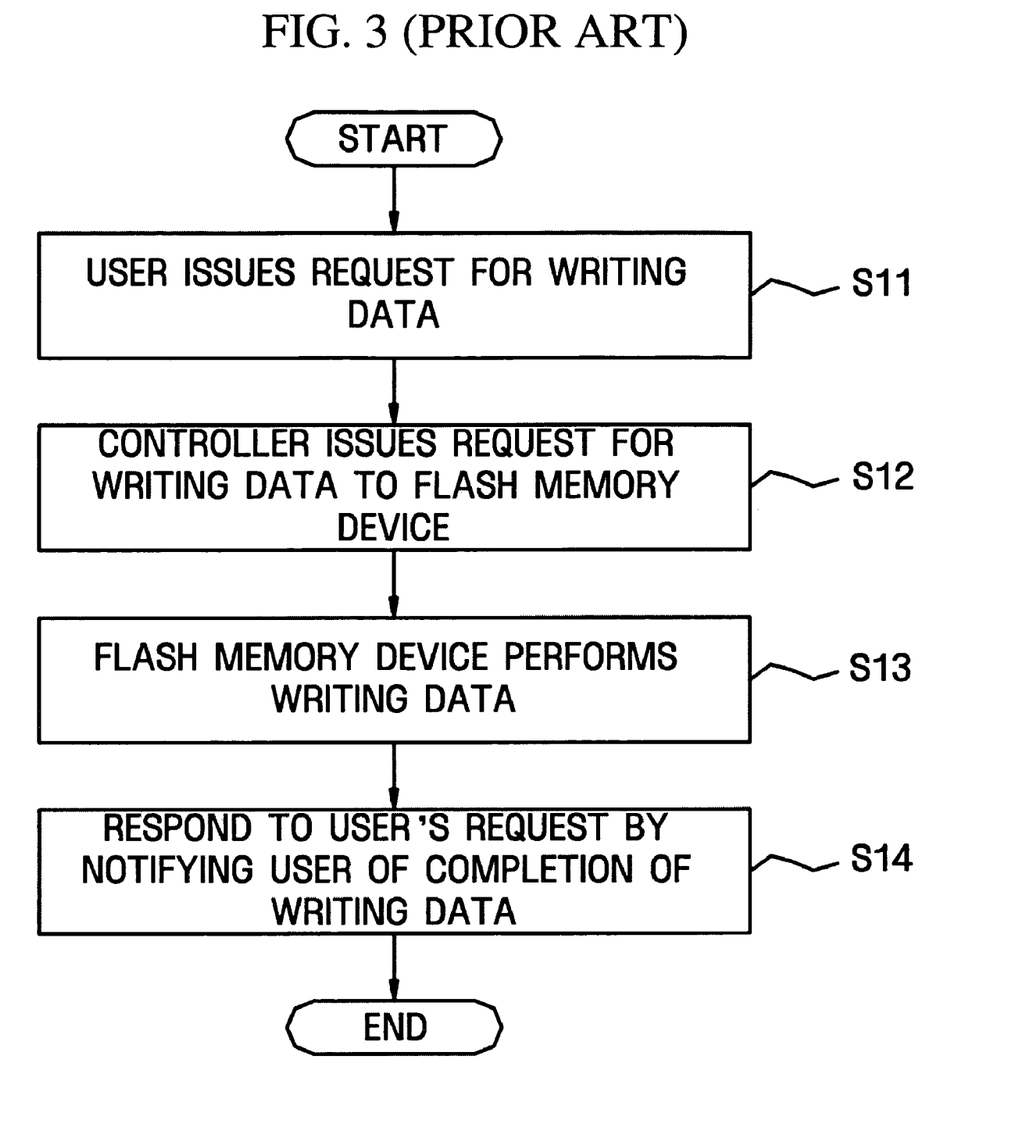
FIG. 3 is a flowchart of a conventional data management method used for a flash memory.

A conventional data management method used for a flash memory is illustrated in FIG. 3. Referring to FIGS. 2 and 3, in operation S11, a user issues a request for writing data to a sector of a flash memory to the user request unit 11.

In operation S12, the controller issues a request for performing a predetermined operation for writing data to the sector to the flash device driver 13 in response to the user's request.

The writing of data to the sector may require an operation of erasing a block or writing data to a physical page.

Specifically, the predetermined operation for writing data to the sector may be at least one of copying effective sectors in the block where the sector belongs to another block or erasing the block where the sector belongs.

In operation S13, data is written to the sector in response to a request issued by the flash device driver 13.

In operation S14, if the writing of data to the sector is completed, a response message indicating that the writing of data to the sector is completed is transmitted to the user request unit 11 via the controller 12, and thus the user can recognize the completion of the writing of data to the sector based on the response message.

However, the conventional data management apparatus and method used for a flash memory have the disadvantage that the user cannot imagine what operation has been performed inside the flash memory before writing data to the sector.

Figure 4A:
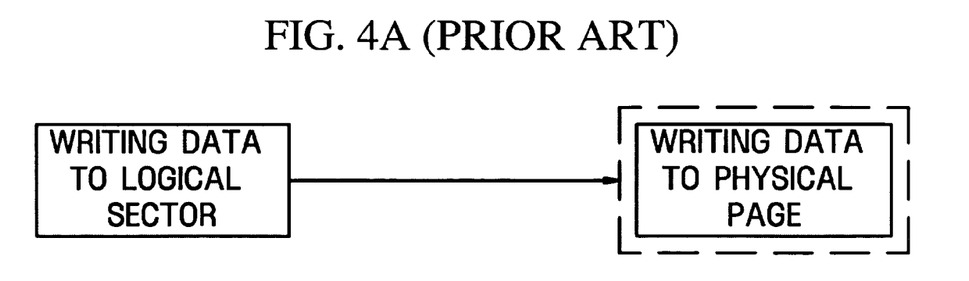
FIG. 4A is a diagram illustrating an occasion when writing data to a logical sector is completed by performing only single physical operation.
Figure 4B:
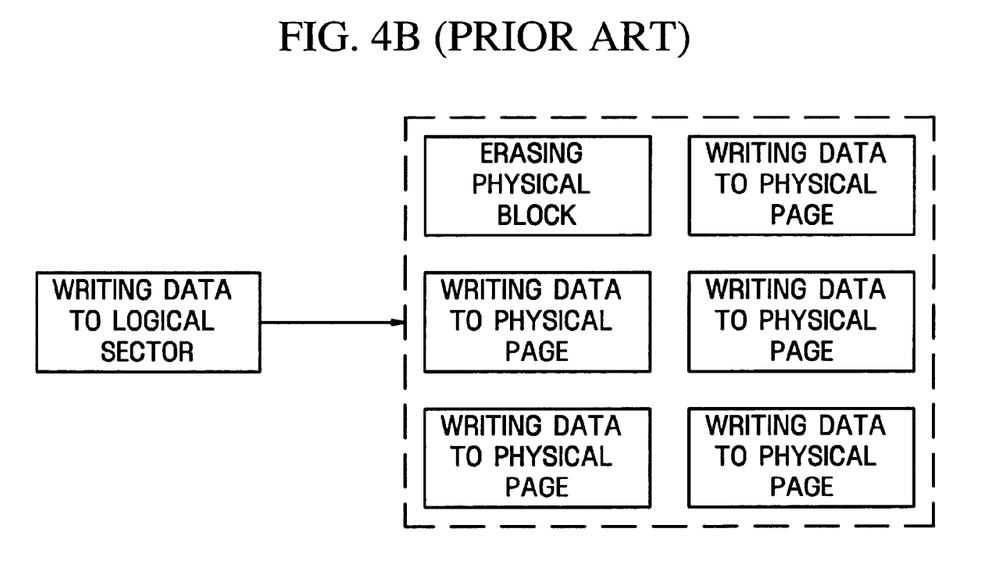
FIG. 4B is a diagram illustrating an occasion when writing data to a logical sector is completed by performing a plurality of physical operations.

In other words, writing data to a sector may be completed by simply writing data to a physical page, as shown in FIG. 4A, or may be completed by performing a plurality of iterations of erasing a block and then writing data to a physical page, as shown in FIG. 4B.

Therefore, it is impossible for the user to expect when he or she will be notified of the completion of the writing data to the sector by receiving a response message because the duration of the predetermined operation for writing data to the sector considerably varies depending on whether and how many times the copying of effective sectors of the block where the sector belongs to another block and the erasing of the block where the sector belongs are performed.

Figure 5:
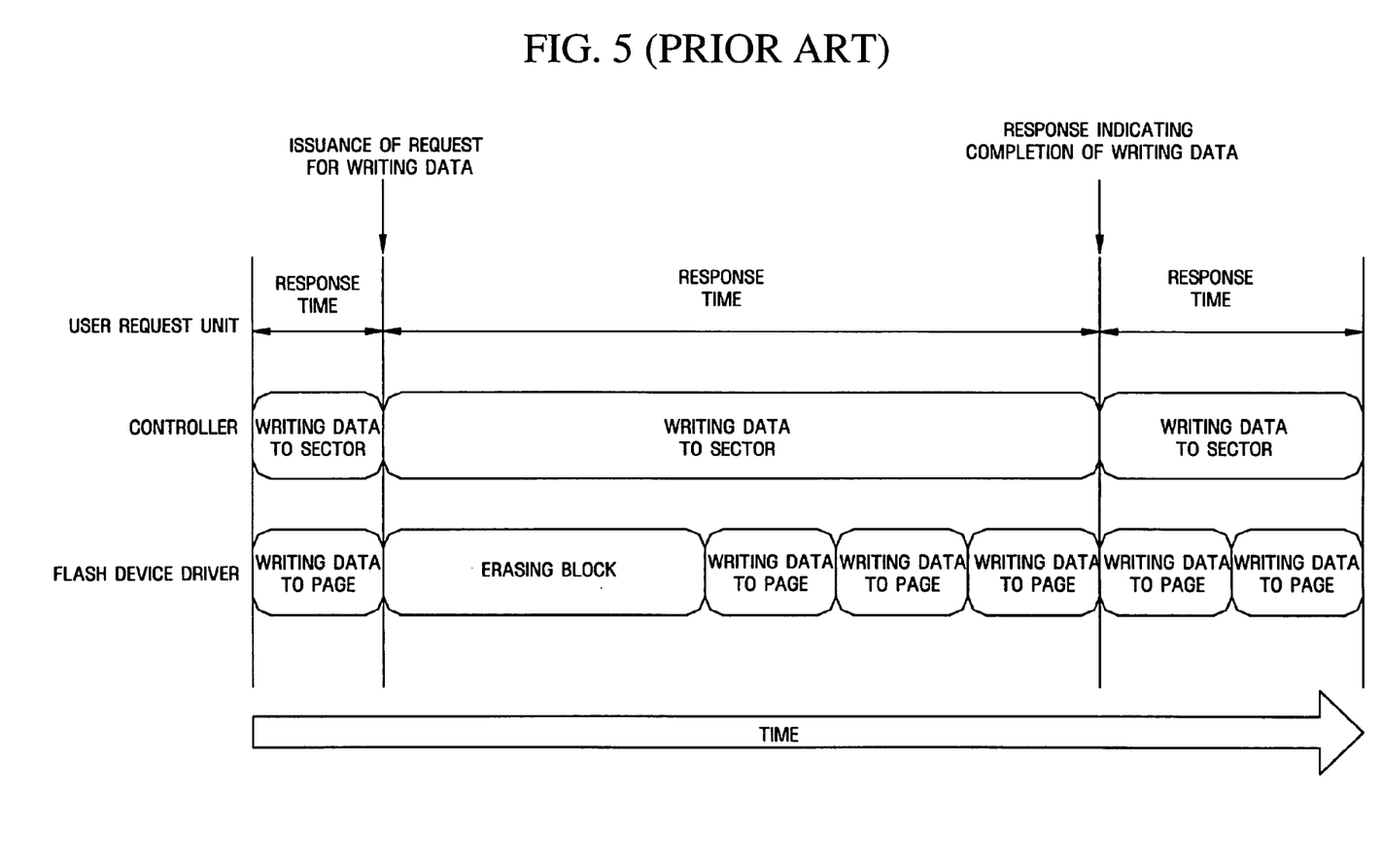
FIG. 5 is a diagram illustrating a data operation performed using the conventional data management apparatus and method used for a flash memory.

For example, referring to FIG. 5, if the user issues a request for writing data to the user request unit 11, the user request unit 11 simply stands by without performing any operations until it is notified of the completion of the writing of data by receiving a response message.

If it takes 200 microseconds (ms) to write data to a page and it takes 2 milliseconds to erase a block, the user request unit 11 may have to wait for 200 ms to several microseconds or several seconds until it receives the response message.

Figure 6:
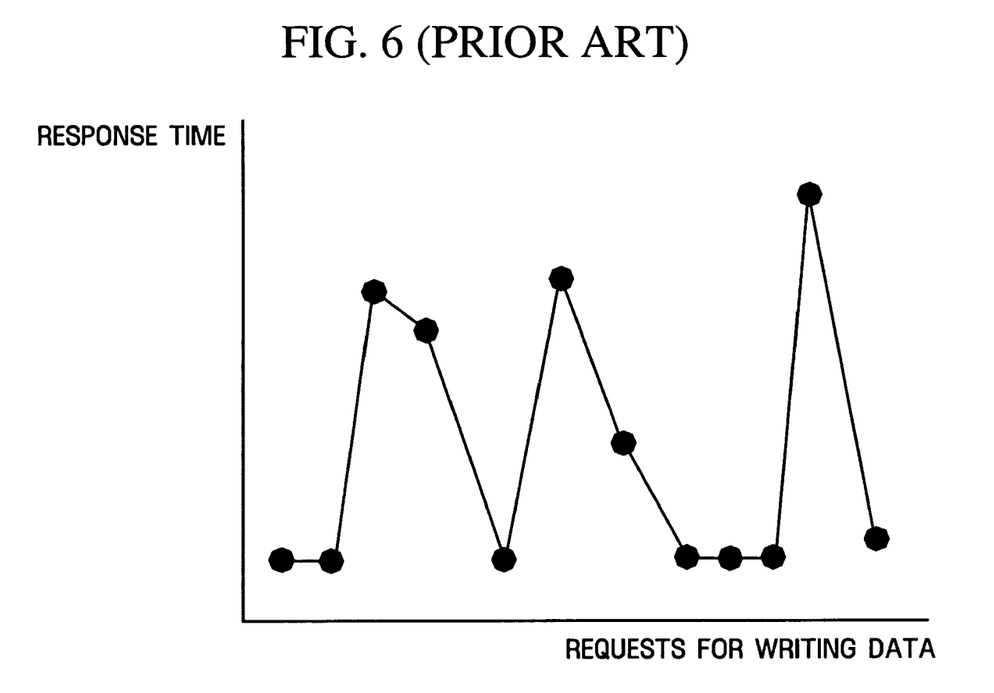
FIG. 6 is a graph illustrating various response times achieved in response to requests for performing a data operation on a flash memory.

In short, writing data to sectors of a flash memory using the conventional data management apparatus and method used for a flash memory may end up in different response times, as shown in FIG. 6, depending on an internal algorithm of the flash memory, thus causing problems when processing the flash memory in real time.

In addition, because of such different response times, the conventional data management apparatus and method used for a flash memory may not be able to satisfactorily serve a user's request, thus deteriorating the overall performance of the flash memory.

SUMMARY OF THE INVENTION

The present invention provides a data management apparatus and method used for a flash memory which can expect response time within which a user will receive a response message regarding his or her request for performing a predetermined data operation on the flash memory and thus can perform an operation, other than the predetermined data operation, on the flash memory during the response time.

According to an aspect of the present invention, there is provided a data management apparatus used for a flash memory, including an operation determination unit which determines operations required for performing a data operation on a flash memory, the data operation being requested by a user using a user program, an operation registration unit with which an operation list including the operations determined to be required for performing the requested data operation on the flash memory is registered, and an operation processing unit which selects one of the operations included in the operation list registered with the operation registration unit and performs the selected operation. The operation determination unit may determine operations that should be performed on the flash memory ahead of the requested data operation. In addition, the operation registration unit may comprise a memory unit which stores data required for performing the requested data operation on the flash memory.

Further, the operation processing unit performs the operations included in the operation list within a predetermined amount of time allocated thereto by the user program. The operation processing unit may also notify the user program of the operation results after the predetermined amount of time has lapsed.

In a multi-process supporting environment, the operation processing unit may comprise a background processing unit which allocates a predetermined amount of time to the operation processing unit so that the operation processing unit can perform the operations included in the operation list within the predetermined amount of time.

If the background processing unit receives a request for controlling the operation processing unit from the user program, it receives a response to the request for controlling the operation processing unit from the operation processing unit and then transmits the received response to the user program. The operation processing unit may notify the background processing unit of the operation results obtained by the operation processing unit after the predetermined amount of time has lapsed.

In addition, the operation processing unit may perform all of the operations included in the operation list in an order in which they are presented in the operation list or according to their respective priority levels within the predetermined amount of time allocated thereto or selects some of the operations included in the operation list and then performs only the selected operations within the predetermined amount of time allocated thereto.

A predetermined amount of time is repeatedly allocated to the operation processing unit, and the operation processing unit performs the operations included in the operation list throughout the allocated times until the requested data operation is completed.

If the user issues a request for reading data using the user program, the operation processing unit may determine whether the data exists in the memory unit. In addition, if the data exists in the memory unit, the operation processing unit may read the data from the memory unit. If the data does not exist in the memory unit, the operation processing unit may read the data from the flash memory.

According to another aspect of the present invention, there is provided a data management method used for a flash memory, comprising allowing a user to issue a request for performing a data operation on a flash memory using a user program, determining operations required for performing the data operation on the flash memory and registering an operation list including the operations determined to be required for performing the data operation on the flash memory, and selecting one of the operations included in the operation list and performing the selected operation.

The determining may comprise determining operations that should be performed on the flash memory ahead of the requested data operation. In addition, the determining may comprise storing data required for performing the requested data operation on a predetermined memory. The selecting may comprise processing the operations within a predetermined amount of time allocated thereto by the user program. The selecting may comprise notifying the user program of the operation results after the predetermined amount of time has lapsed.

In a multi-process supporting environment, the selecting may comprise allowing the user program to process the operations included in the operation list within the predetermined amount of time and allowing a background processing unit to allocate a response corresponding thereto to be transmitted to the user program. The selecting may comprise notifying the background processing unit of the operation results after the predetermined amount of time has lapsed. In addition, the selecting may comprise processing the operations within a plurality of predetermined allocated times until the requested data operation is completed.

In this case, the processing may comprise processing the operations in an order in which they are presented in the operation list or according to their respective priority levels within the predetermined allocated times or selecting some of the operations included in the operation list and then performing only the selected operations within the predetermined allocated times.

According to another aspect of the present invention, the data management method may further comprise allowing the user to issue a request for reading data from a predetermined sector using the user program, and determining whether the operation list includes an operation required for reading data from the predetermined sector in response to the request for reading data from the predetermined sector.

If the operation list includes an operation required for reading data from the predetermined sector, the determining may comprise reading data that has been stored together with the operation required for reading data from the predetermined sector. If the operation list does not include an operation required for reading data from the predetermined sector, the determining may comprise reading data from the flash memory.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Aspects of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will convey the concept of the invention to those skilled in the art. Like reference numerals refer to like elements throughout the specification.

The present invention will now be described more fully with reference to the accompanying drawings, in which exemplary embodiments of the invention are shown.

A flash memory is generally classified into a small-block flash memory and a large-block flash memory. Whereas the small-block flash memory has a logical operation unit and a physical operation unit of the same size, the large-block flash memory has a physical operation unit having a size larger than that of a logical operation unit. The logical operation unit, which is a data operation unit used by a user through a user's program, are generally called a sector, and the physical operation unit, which is a data operation unit used in the flash memory, is generally called a page. Sizes of the logical and physical operation units may vary according to the type of an apparatus employing the flash memory irrespective of the sector or page. Therefore, in the small-block flash memory, the sector and the page are identical, while in the large-block flash memory the page includes one or more sectors.

In order to overwrite a sector of a flash memory to which data has already been written, a block to which the sector belongs to should be erased first. If the block where the sector belongs has effective sectors, the effective sectors may be copied to another block before erasing the block where the sector belongs. Accordingly, the types of operations required for writing data to a sector of a flash memory may vary depending on an internal algorithm of the flash memory.

A user cannot anticipate the type and duration of each of the operations required for writing data to a sector of the flash memory. Thus, a user program must stand by until receiving a response message indicating whether a data operation requested by the user is completed.

In a case where software for managing data stored in the flash memory is located on a non-preemptive kernel layer, it monopolizes kernel resources. In this case, a conventional data management apparatus has no choice but to wait until receiving the response message without performing any operations, and thus, the performance of the conventional data management apparatus may deteriorate.

However, a data management apparatus used for a flash memory according to an exemplary embodiment of the present invention can help predict when a user will receive a response to his or her request for performing a data operation on a flash memory and can perform operations, other than the data operation, until the data operation is completed.

Figure 7:
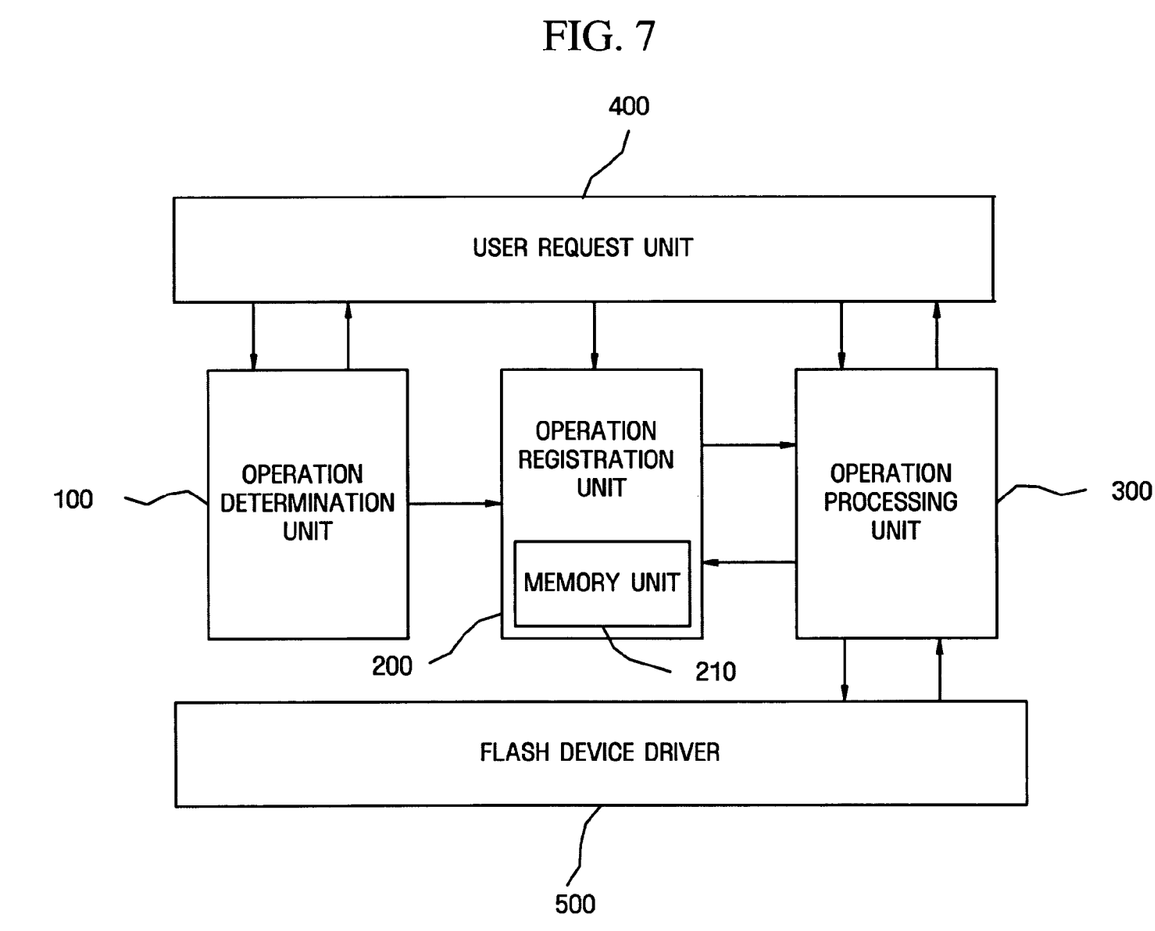
FIG. 7 is a block diagram of a data management apparatus used for a flash memory, according to an exemplary embodiment of the present invention.

FIG. 7 is a block diagram of a data management apparatus used for a flash memory according to an exemplary embodiment of the present invention. Referring to FIG. 7, the data management apparatus includes an operation determination unit 100, which determines which operations need to be performed for a data operation requested by a user, an operation registration unit 200, which registers the operations determined to be required for performing the requested data operation, and an operation processing unit 300, which performs the registered operations.

In addition, the data management apparatus also includes a user request unit 400, to which the user issues a request for performing the requested data operation and from which the user receives a response message indicating whether the requested data operation is completed, and a flash device driver 500, which helps to perform the operations determined to be required for performing the requested data operation on a flash memory under the control of the operation processing unit 300.

Each of a plurality of units of the data management apparatus, i.e., the operation determination unit 100, the operation registration unit 200, the operation processing unit 300, the user request unit 400, and the flash device driver 500, may be provided as software. Alternatively, the operation determination unit 100, the operation registration unit 200, the operation processing unit 300, the user request unit 400, and the flash device driver 500 may be incorporated as a single software configuration.

Still alternatively, the operation determination unit 100, the operation registration unit 200, the operation processing unit 300, the user request unit 400, and the flash device driver 500 may be classified into a plurality of groups, and each of the groups may be provided as software.

Preferably, but not necessarily, the operation determination unit 100 includes a flash mapping engine, which deals with logical address-to-physical address mapping information and algorithms, and the operation registration unit 200 includes a queue or buffer, which stores the operations determined to be required for performing the requested data operation.

Here, if the user requests a predetermined data operation, the operation determination unit 100 determines which operations should be performed ahead of the requested data operation and generates an operation list including the operations determined to be required for performing the requested data operation.

For example, if the user issues a request for writing data to a sector of the flash memory, the operation determination unit 100 determines whether erasing a block where the sector belongs and/or copying effective sectors in the block where the sector belongs should be performed.

Figure 8:
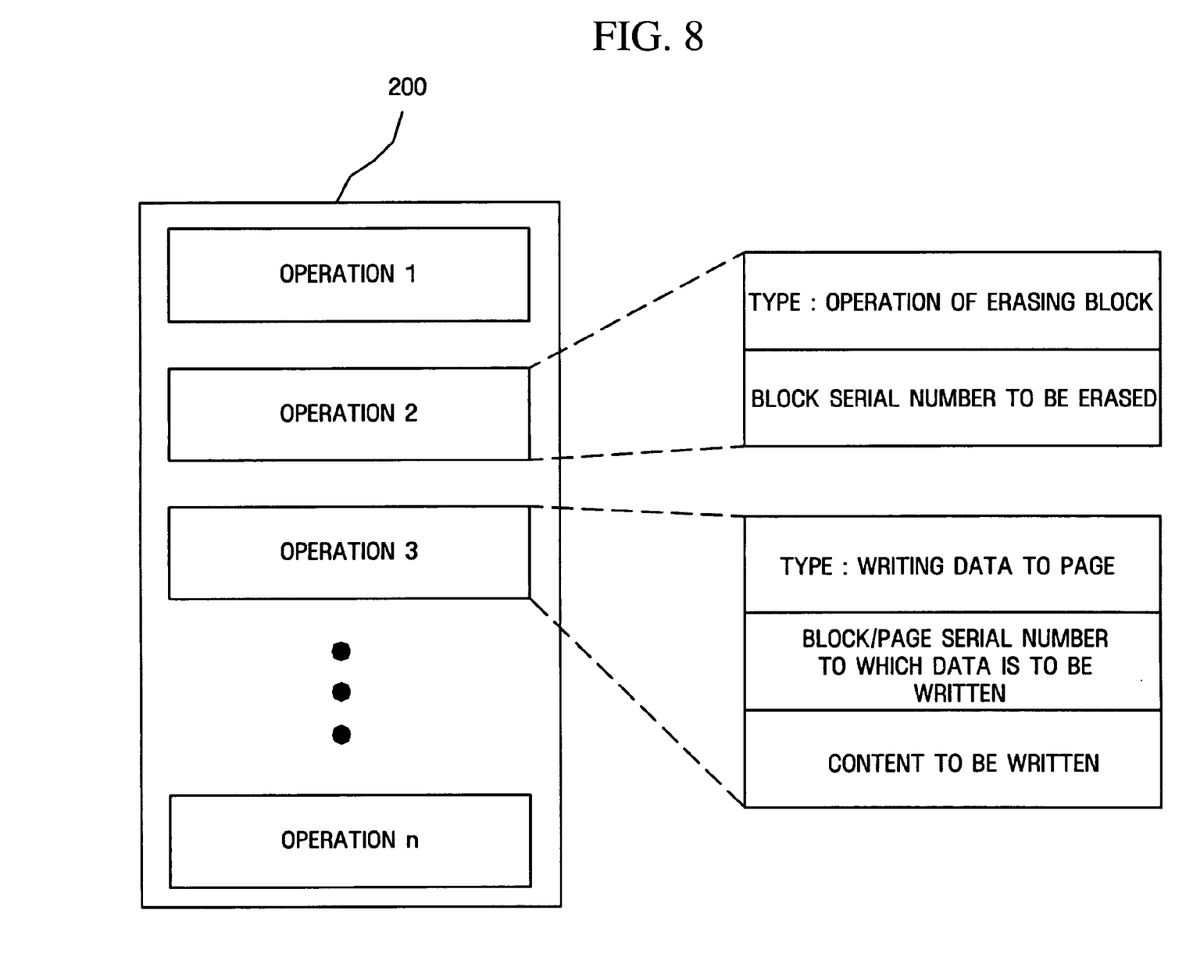
FIG. 8 is a detailed block diagram of an operation registration unit of FIG. 7.

The operation list may be registered with the operation registration unit 200, as illustrated in FIG. 8. The operation registration unit 200 may include a memory unit 210 in which data to be written to a sector of the flash memory at the user's request is stored.

The memory unit 210 may be separated from the operation registration unit 200. Preferably, but not necessarily, the memory unit 210 may be a cache memory, a ROM, a PROM, an EPROM, an EEPROM, a flash memory, an SRAM, or a DRAM.

Meanwhile, the user request unit 400 allocates a predetermined amount of time to the operation processing unit 300. Then, the operation processing unit 300 extracts some of a plurality of operations that it can process within the predetermined amount of time from the operation list registered with the operation registration unit 200, processes the extracted operations within the predetermined amount of time, and responds to the user request unit 400 based on the processing results.

Specifically, the operation processing unit 300 may respond to the user request unit 400 by transmitting a response message containing information, on whether the requested data operation is completed, to the user request unit 400.

In other words, if the user request unit 400 receives a response message indicating that the requested data operation is yet to be completed from the operation processing unit 300, it allocates a predetermined amount of time to the operation processing unit 300 again. Otherwise, the user request unit 400 notifies the user of the completion of the requested data operation.

The operation processing unit 300 may process the operations included in the operation list within the predetermined amount of time in an order in which they are presented in the operation list or according to their respective priority levels.

Alternatively, the operation processing unit 300 may select some of the operations included in the operation list that it is believed to be capable of processing within the predetermined amount of time in consideration of the order in which the operations are presented in the operation list or the priority levels of the operations and then may perform only the selected operations. Accordingly, the user request unit 400 can perform an operation, other than the requested data operation, during the predetermined amount of time, thus enhancing the performance of an entire system.

In addition, if the requested data operation is not completed within the predetermined amount of time, it repeatedly allocates a predetermined amount of time to the operation processing unit 300 until the requested data operation is completed. Therefore, it is possible for the user to perform an operation, other than the requested data operation, using the user request unit 400.

As described above, the data management apparatus used for a flash memory according to the exemplary embodiment of the present invention can perform the requested data operation in several stages and can allow the user request unit 400 to perform an operation, other than the requested data operation. Thus, the operation registration unit 200 may serve as a cache memory. For example, if the user issues a request for writing predetermined data, the predetermined data is stored in the memory unit 210 of the operation registration unit 200.

If the user also issues a request for reading the predetermined data within a predetermined amount of time allocated by the operation processing unit 300, the predetermined data may be read from the memory unit 210, rather than from the flash memory. However, if the predetermined data does not exist in the memory unit 210, it is read from the flash memory.

Figure 12:
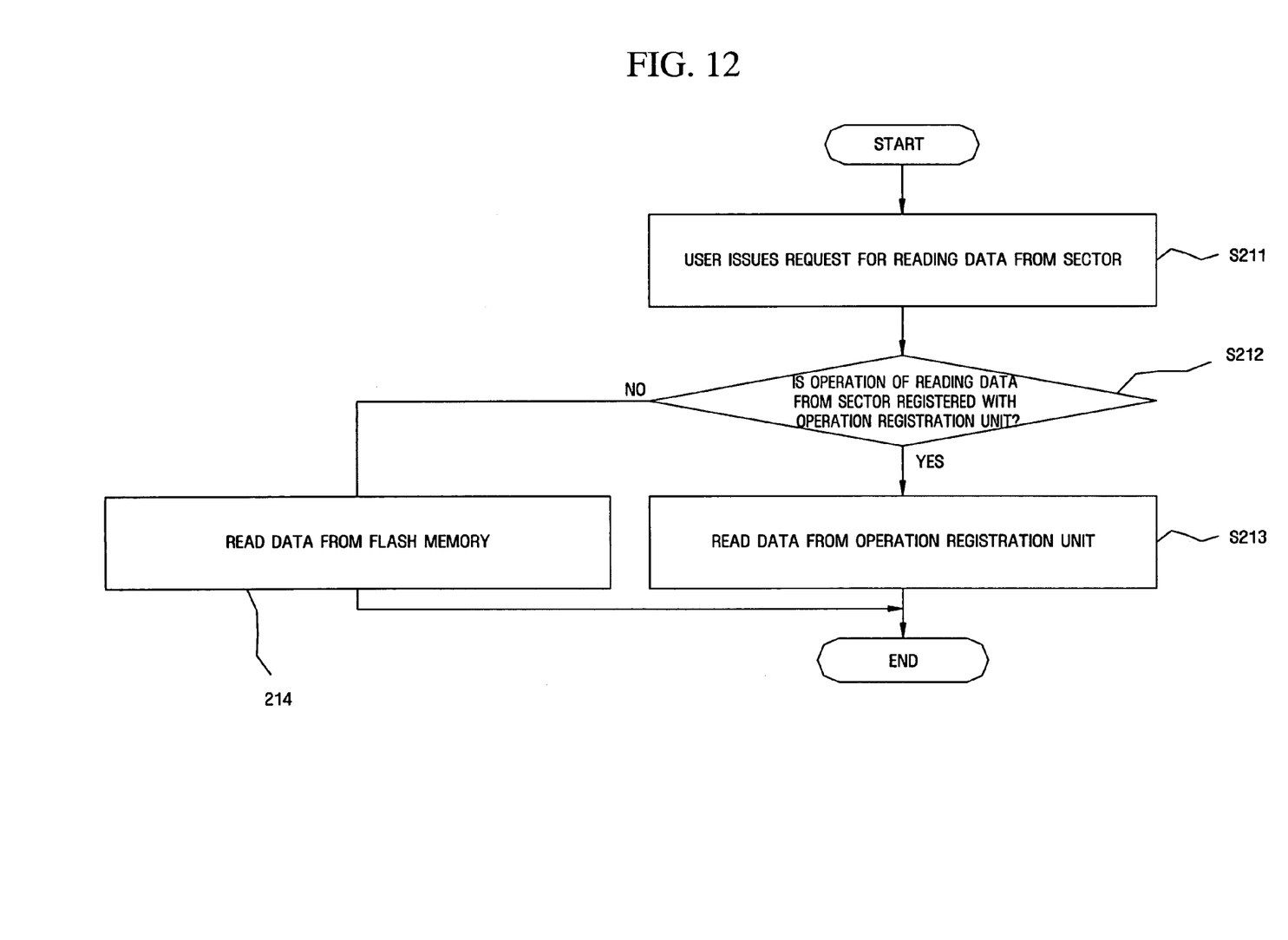
FIG. 12 is a flowchart of a caching method of the operation registration unit of FIG. 7.

A method of reading data from the memory unit 210 of the operation registration unit 200 will be described in further detail later with reference to FIG. 12.

Figure 9:
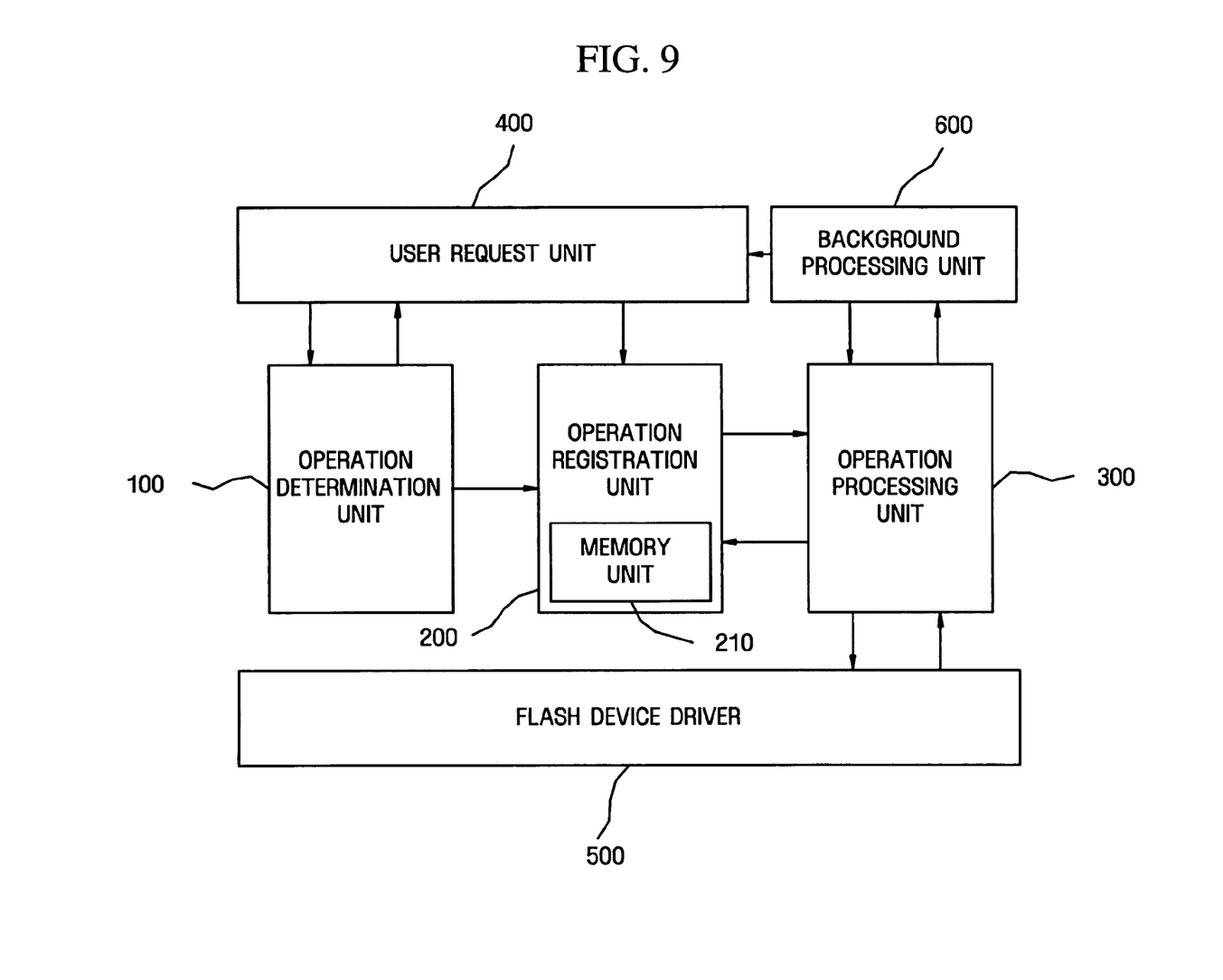
FIG. 9 is a block diagram illustrating a data management apparatus used for a flash memory, according to another exemplary embodiment of the present invention, which can be used in a multi-process supporting environment.

In another exemplary embodiment of the present invention, in which the data management apparatus is used in a multi-process supporting system, as illustrated in FIG. 9 showing a data management apparatus used for a flash memory, the background processing unit 600 serves some of the functions provided by the operation processing unit 300 of FIG. 3.

Specifically, the background processing unit 600 controls the operation processing unit 300 in response to a request issued by a user request unit 400, receives a response message from an operation processing unit 300, and transmits the response message to the user request unit 400, thereby notifying a user that operations required for performing a data operation requested by the user have been registered with an operation registration unit 200.

In addition, the user request unit 400 may issue a request for controlling the operation processing unit 300 to the background processing unit 600 and may perform other operations.

Thereafter, the operations registered with the operation registration unit 200 are controlled by the background processing unit 600 to control the operation processing unit 300, thereby maximizing the efficiency of the multi-process supporting system.

Each of a plurality of units of the data management apparatus, including an operation determination unit 100, the operation registration unit 200, the operation processing unit 300, the user request unit 400, a flash device driver 500, and the background processing unit 600, may be provided as software.

Alternatively, the operation determination unit 100, the operation registration unit 200, the operation processing unit 300, the user request unit 400, the flash device driver 500, and the background processing unit 600 may be incorporated as a single software configuration.

Still alternatively, the operation determination unit 100, the operation registration unit 200, the operation processing unit 300, the user request unit 400, the flash device driver 500, and the background processing unit 600 may be classified into a plurality of groups, and each of the groups may be provided as software.

The operation of the data management apparatus of FIG. 7 or 9 will now be described more fully.

Figure 10:
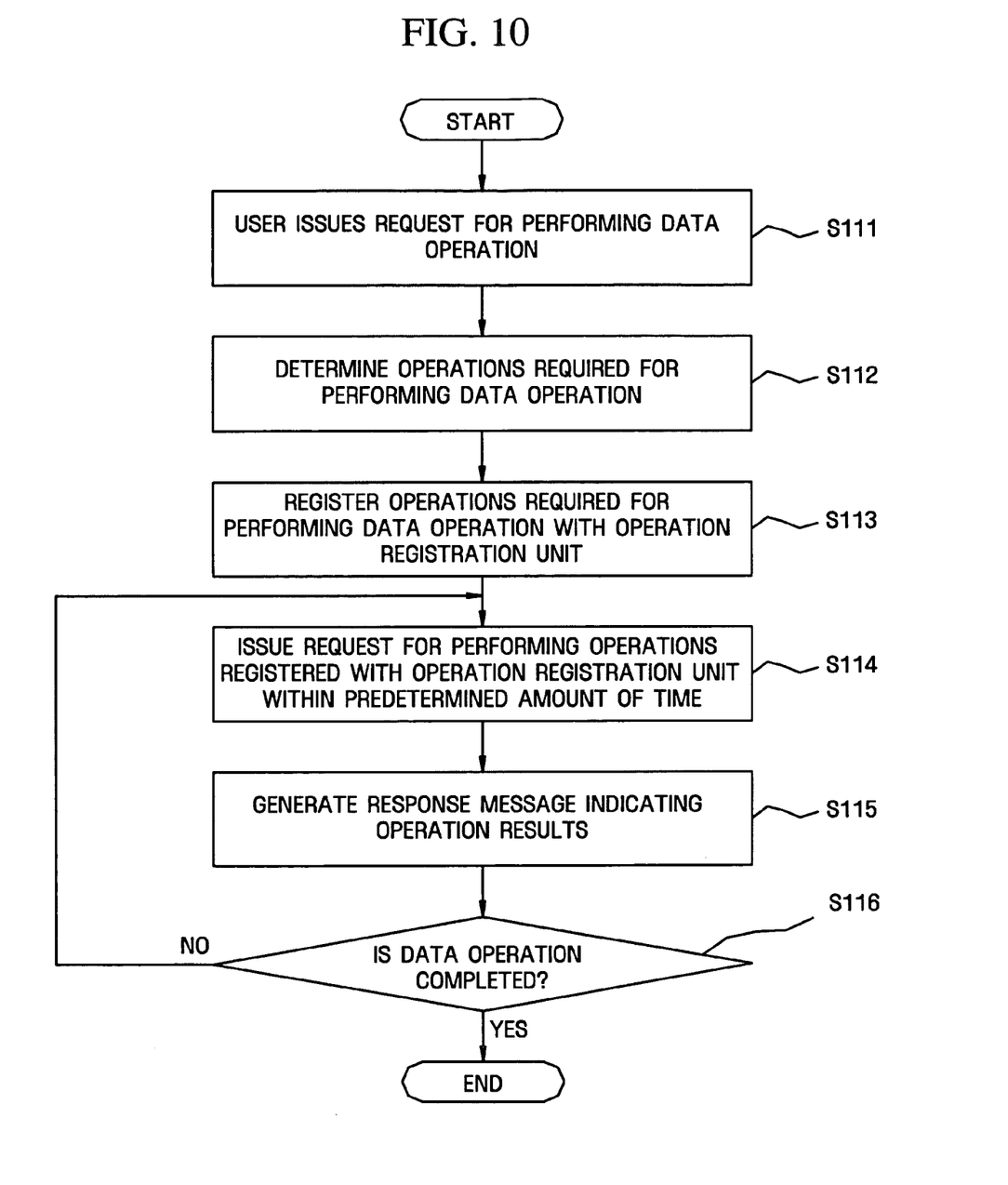
FIG. 10 is a flowchart of a data management method used for a flash memory, according to an exemplary embodiment of the present invention.

FIG. 10 is a flowchart of a data management method used for a flash memory, according to an exemplary embodiment of the present invention.

Referring to FIG. 7 or 9, and FIG. 10, in operation S111, a user issues a request for performing a predetermined data operation on a flash memory to the user request unit 400.

It is assumed that the predetermined data operation is an operation of writing data to a predetermined sector of the flash memory.

In operation S112, the operation determination unit 100 determines which operations need to be performed in order to perform the requested data operation. In operation S113, the operation determination unit 100 registers the operations determined to be required for performing the requested data operation with the operation registration unit 200.

Specifically, if the user desires to write data to the predetermined sector, the operation determination unit 100 determines whether erasing a block where the predetermined sector belongs and/or copying effective blocks in the block to another block should be performed, generates an operation list including the operations determined to be required for writing data to the predetermined sector based on the determination results, and registers the operation list with the operation registration unit 200.

Data desired to be written to the predetermined sector may be registered with the memory unit 210 of the operation registration unit 200 alongside the operation list.

In operation S114, the user request unit 400 allocates a predetermined amount of time to the operation processing unit 300, and the operation processing unit 300 issues a request for performing the operations registered with the operation registration unit 200 within the predetermined amount of time.

Here, the operation processing unit 300 is allowed to perform operations registered with the operation registration unit 200 for the predetermined amount of time allocated to the operation processing unit 300.

In operation, S115, the operation processing unit 300 performs the operations registered with the operation registration unit 200 in a plurality of stages within the predetermined amount of time until the requested data operation is completed and then transmits a response message indicating whether the requested data operation is completed to the user request unit 400 based on the operation results.

Accordingly, the user request unit 400 can recognize whether the requested data operation is completed or how much of the requested data operation is completed based on the response message transmitted from the operation processing unit 300.

The response message transmitted from the operation processing unit 300 to the user request unit 400 may contain information on errors that may have occurred in the process of performing the requested data operation.

As described above, the user request unit 400 can recognize whether the requested data operation is completed or how much of the requested data operation is completed based on the response message transmitted from the operation processing unit 300.

Thus, the user request unit 400 can perform an operation other than the requested data operation.

In operation S116, the operations S114 and S115 are repeatedly performed until the user request unit 400 receives a response message indicating that the requested data operation is completed from the operation processing unit 300.

The data management method of FIG. 10 will now be described more fully with reference to FIG. 11.

Figure 11:
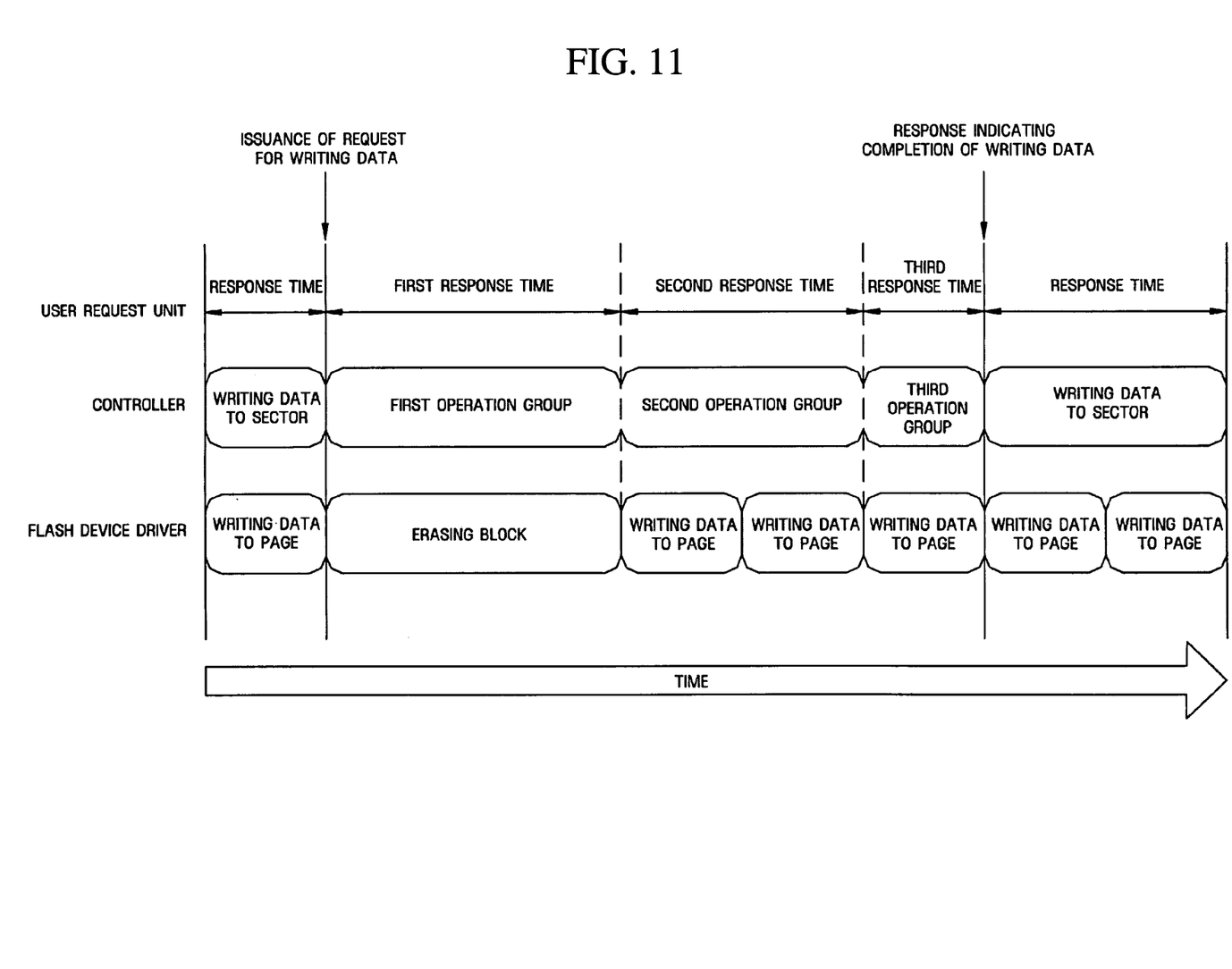
FIG. 11 is a diagram illustrating a data operation performed on a flash memory according to an exemplary embodiment of the present invention.

Referring to FIG. 11, when a user issues a request for performing a predetermined data operation, for example, a request for writing data to a predetermined sector of a flash memory, the operation determination unit 100 determines which operations need to be performed in order to perform the requested data operation, generates an operation list including the operations determined to be required for performing the requested data operation, and registers the operation list with the operation registration unit 200.

The operation processing unit 300 performs the operations registered with the operation registration unit 200 within a predetermined amount of time allocated thereto and transmits a response message to the user request unit 400.

In other words, if the user request unit 400 allocates first response time to the operation processing unit 300, the operation processing unit 300 performs a first group of operations during the first response time and notifies the user request unit 400 of the operation results.

If the writing of data to the predetermined sector is yet to be completed, the user request unit 400 allocates a second response time and then a third response time to the operation processing unit 300 until the writing of data to the predetermined sector is completed. Then, the operation processing unit 300 may perform a second group of operations during the second response time and then may perform a third group of operations during the third response time. Accordingly, the user request unit 400 can recognize whether the requested data operation is completed and how much of the requested data operation is completed.

In addition, the user request unit 400 can perform an operation other than the requested data operation during the first, second, or third response time, thus enhancing the efficiency of an entire system. For example, if the requested data operation is writing data to the predetermined sector, the user request unit 400 may read data from the flash memory during the first, second, or third response time while writing data to the predetermined sector, in which case, the operation registration unit 200 serves as a cache memory. Since the data desired to be written to the predetermined sector is also registered with the operation registration unit 200, it can be directly read out from the operation registration unit 200 if the user issues a request for reading data from the predetermined sector.

A method of reading data registered with the operation registration unit 200 will now be described with reference to FIG. 12. Referring to FIG. 12, in operation S211, a user issues a request for reading data from a predetermined sector of a flash memory.

In operation S212, it is determined whether an operation of reading data from the predetermined sector has already been registered with the operation registration unit 200. In operation S213, if the operation of reading data from the predetermined sector has been registered with the operation registration unit 200, data is read from the operation registration unit 200. In operation S214, if the operation of reading data from the predetermined sector has not yet been registered with the operation registration unit 200, data is read from the flash memory.

Alternatively, if the data management apparatus of FIG. 9 is used in a multi-process supporting system, the background processing unit 600 controls the operation processing unit 300, and thus, the user request unit 400 receives a response message only indicating that operations required for performing a data operation requested by a user have been registered with the operation registration unit 200. Specifically, the user request unit 400 issues a request for controlling the operation processing unit 300 to the background processing unit 600 and transmits a response message received from the operation processing unit 300 to the user request unit 400.

Accordingly, the operation processing unit 300 performs the operations registered with the operation registration unit 200 and notifies the background processing unit 600 of the operation results, and the background processing unit 600 transmits a response message received from the operation processing unit 300 to the user request unit 400.

The background processing unit 600 transmits information on response time allocated to the operation processing unit 300 to the user request unit 400. Thus, the user request unit 400 can perform an operation other than the requested data operation during the response time.

While the data management apparatus and method used for a flash memory according to the present invention have been described with reference to the drawings, the invention is not limited to the illustrative exemplary embodiments and drawings disclosed in the specification and many variations and modifications can be made without substantially departing from the principles of the present invention.

The data management apparatus and method used for a flash memory according to the present invention have the following exemplary features.

First, it is possible for a user to expect when he or she will receive a response message regarding his or her request for performing a data operation on a flash memory by allocating a predetermined amount of time for the data operation and then performing the data operation within the predetermined amount of time. Thus, it is possible to considerably enhance the performance of a system.

Second, since the data management apparatus, it is possible to considerably enhance the performance of a system with frequent data updates.

What is claimed is:

1. A data management apparatus used for a flash memory, comprising:
an operation determination unit which determines operations required for performing a requested data operation on a flash memory, the requested data operation being requested by a user using a user program;
an operation registration unit with which an operation list including the operations determined to be required for performing the requested data operation on the flash memory is registered; and
an operation processing unit which selects an operation among the operations included in the operation list registered with the operation registration unit and performs the operation which is selected,
wherein the operation determination unit determines operations that should be performed on the flash memory prior to the requested data operation,
the operation registration unit comprises a memory unit which stores data required for performing the requested data operation on the flash memory, and
in a multi-process supporting environment, the operation processing unit comprises a background processing unit which allocates a predetermined amount of time to the operation processing unit so that the operation processing unit can perform the operations included in the operation list within the predetermined amount of time.

2. The data management apparatus of claim 1, wherein the operation processing unit performs the operations included in the operation list within a predetermined amount of time allocated thereto by the user program.

3. The data management apparatus of claim 2, wherein the operation processing unit notifies the user program of the operation results after the predetermined amount of time has lapsed.

4. The data management apparatus of claim 3, wherein the operation processing unit performs all of the operations included in the operation list in an order in which the operations are presented in the operation list, according to priority levels of the respective operations within the predetermined amount of time allocated thereto, or by selecting some operations among the operations included in the operation list and then performing only the operations which are selected within the predetermined amount of time allocated thereto.

5. The data management apparatus of claim 3, wherein a predetermined amount of time is repeatedly allocated to the operation processing unit, and the operation processing unit performs the operations included in the operation list throughout the predetermined amount of time until the requested data operation is completed.

6. The data management apparatus of claim 3, wherein if the user issues a request for reading data using the user program, the operation processing unit determines whether the data exists in the memory unit.

7. The data management apparatus of claim 6, wherein if the data exists in the memory unit, the operation processing unit reads the data from the memory unit.

8. The data management apparatus of claim 7, wherein if the data does not exist in the memory unit, the operation processing unit reads the data from the flash memory.

9. The data management apparatus of claim 1, wherein if the background processing unit receives a request for controlling the operation processing unit from the user program, the background processing unit receives a response to the request for controlling the operation processing unit from the operation processing unit and then transmits the response to the user program.

10. The data management apparatus of claim 9, wherein the operation processing unit notifies the background processing unit of the operation results obtained by the operation processing unit after the predetermined amount of time has lapsed.

11. The data management apparatus of claim 10, wherein the operation processing unit performs all of the operations included in the operation list in an order in which the operations are presented in the operation list, according to priority levels of the respective operations within the predetermined amount of time allocated thereto, or by selecting some operations among the operations included in the operation list and then performing only the operations which are selected within the predetermined amount of time allocated thereto.

12. The data management apparatus of claim 10, wherein a predetermined amount of time is repeatedly allocated to the operation processing unit, and the operation processing unit performs the operations included in the operation list throughout the predetermined amount of time until the requested data operation is completed.

13. The data management apparatus of claim 10, wherein if a user issues a request for reading data using the user program, the operation processing unit determines whether the data exists in the memory unit.

14. The data management apparatus of claim 13, wherein if the data exists in the memory unit, the operation processing unit reads the data from the memory unit.

15. The data management apparatus of claim 14, wherein if the data does not exist in the memory unit, the operation processing unit reads the data from a flash memory.

16. The data management apparatus of claim 1, wherein the operations determined to be required for performing the requested data operation include copying effective sectors of a first block where a recorded data sector belongs to a second block and erasing of the first block where the recorded data sector belongs.

17. The data management apparatus of claim 16, wherein the operations determined to be required for performing the requested data operation vary according to which physical addresses of the flash memory are occupied at the time of the requested data operation.

18. The data management apparatus of claim 16, wherein the requested data operation is a request for writing data to a sector of the flash memory.

19. A data management method used for a flash memory, comprising:
receiving a request for performing a requested data operation on a flash memory using a user program;
determining operations required for performing the data operation on the flash memory and registering an operation list including the operations determined to be required for performing the data operation on the flash memory; and
selecting an operation among the operations included in the operation list and performing the operation which is selected,
wherein the determining comprises determining operations that are to be performed on the flash memory ahead of the requested data operation,
the determining comprises storing data required for performing the requested data operation on a predetermined memory, and
in a multi-process supporting environment, the selecting comprises allowing the user program to process the operations included in the operation list within the predetermined amount of time and allowing a background processing unit to allocate a response corresponding thereto to be transmitted to the user program.

20. The data management method of claim 19, wherein the selecting comprises processing the operations within a predetermined amount of time allocated thereto by the user program.

21. The data management method of claim 20, wherein the selecting comprises notifying the user program of the operation results after the predetermined amount of time has lapsed.

22. The data management method of claim 21, wherein the selecting comprises processing the operations within a plurality of predetermined allocated times until the requested data operation is completed.

23. The data management method of claim 22, wherein the processing comprises processing the operations in an order in which the operations are presented in the operation list, according to priority levels of the respective operations within the predetermined allocated times, or by selecting some operations among the operations included in the operation list and then performing only the operations which are selected within the predetermined allocated times.

24. The data management method of claim 23, further comprising:
receiving a request for reading data from a predetermined sector using the user program; and
determining whether the operation list includes an operation required for reading data from the predetermined sector in response to the request for reading data from the predetermined sector.

25. The data management method of claim 24, wherein if the operation list includes an operation required for reading data from the predetermined sector, the determining comprises reading data that has been stored together with the operation required for reading data from the predetermined sector.

26. The data management method of claim 25, wherein if the operation list does not include an operation required for reading data from the predetermined sector, the determining comprises reading data from the flash memory.

27. The data management method of claim 19, wherein the selecting comprises notifying the background processing unit of the operation results after the predetermined amount of time has lapsed.

28. The data management method of claim 27, wherein the selecting comprises processing the operations within a plurality of predetermined allocated times until the requested data operation is completed.

29. The data management method of claim 28, wherein the processing comprises processing the operations in an order in which the operations are presented in the operation list, according to priority levels of the respective operations within the predetermined allocated times, or by selecting some of the operations included in the operation list and then performing only the selected operations within the predetermined allocated times.

30. The data management method of claim 29, further comprising:
allowing a user to issue a request for reading data from a predetermined sector using the user program; and
determining whether the operation list includes an operation required for reading data from the predetermined sector in response to the request for reading data from the predetermined sector.

31. The data management method of claim 30, wherein if the operation list includes an operation required for reading data from the predetermined sector, the determining comprises reading data that has been stored together with the operation required for reading data from the predetermined sector.

32. The data management method of claim 31, wherein if the operation list does not include an operation required for reading data from the predetermined sector, the determining comprises reading data from the flash memory.

33. The data management method of claim 19, wherein the operations determined to be required for performing the requested data operation include copying effective sectors of a first block where a recorded data sector belongs to a second block and erasing of the first block where the recorded data sector belongs.

34. The data management method of claim 33, wherein the operations determined to be required for performing the requested data operation vary according to which physical addresses of the flash memory are occupied at the time of the requested data operation.

35. The data management method of claim 33, wherein the requested data operation is a request for writing data to a sector of the flash memory.

* * * * *